US011086632B2

(12) United States Patent
Jiang (10) Patent No.: US 11,086,632 B2
(45) Date of Patent: Aug. 10, 2021

(54) METHOD AND APPARATUS FOR PROVIDING ACCELERATED ACCESS TO A MEMORY SYSTEM

(71) Applicant: ALIBABA GROUP HOLDING LIMITED, Grand Cayman (KY)

(72) Inventor: Xiaowei Jiang, San Mateo, CA (US)

(73) Assignee: ALIBABA GROUP HOLDING LIMITED, George Town (KY)

( * ) Notice: Subject to any disclaimer, the term of this patent is extended or adjusted under 35 U.S.C. 154(b) by 15 days.

(21) Appl. No.: 15/430,331

(22) Filed: Feb. 10, 2017

(65) Prior Publication Data
US 2018/0232238 A1    Aug. 16, 2018

(51) Int. Cl.
*G06F 13/14*    (2006.01)
*G06F 9/38*    (2018.01)
*G06F 9/30*    (2018.01)
*G06F 12/0875*    (2016.01)
*G06F 12/10*    (2016.01)

(52) U.S. Cl.
CPC .......... *G06F 9/3865* (2013.01); *G06F 9/3004* (2013.01); *G06F 9/30145* (2013.01); *G06F 9/3836* (2013.01); *G06F 9/3861* (2013.01); *G06F 12/0875* (2013.01); *G06F 12/10* (2013.01); *G06F 13/14* (2013.01); *G06F 2212/452* (2013.01); *G06F 2212/65* (2013.01)

(58) Field of Classification Search
CPC .. G06F 9/3865; G06F 9/3004; G06F 9/30145; G06F 9/3861; G06F 12/0875; G06F 12/10; G06F 13/14; G06F 2212/452; G06F 2212/65
See application file for complete search history.

(56) References Cited

U.S. PATENT DOCUMENTS

| 7,334,076 | B2 | 2/2008 | Hendel et al. |
| 7,941,647 | B2 * | 5/2011 | Yates, Jr. ............ G06F 9/30174 712/220 |
| 8,683,143 | B2 | 3/2014 | Akkary et al. |
| 8,954,697 | B2 * | 2/2015 | Horman ................ G06F 12/109 711/165 |
| 9,009,445 | B2 | 4/2015 | Pan |

(Continued)

OTHER PUBLICATIONS

Notification of Transmittal of the International Search Report and the Written Opinion of the International Searching Authority, or the Declaration issued in International Application No. PCT/US2018/017673; dated Apr. 26, 2018 (14 pgs.).

*Primary Examiner* — Cheng Yuan Tseng
(74) *Attorney, Agent, or Firm* — Finnegan, Henderson, Farabow, Garrett & Dunner, LLP (57) ABSTRACT

A computer system is presented. The computer system comprises a memory system that stores data, a computer processor, and a memory access engine. The memory access engine is configured to: receive a first instruction of a computing process from the computer processor, wherein the first instruction is for accessing the data from the memory system; acquire at least a part of the data from the memory system based on the first instruction; and after the acquisition of the at least a first part of the data, transmit an indication to the computer processor to enable the computer processor to execute a second instruction of the computing process.

17 Claims, 7 Drawing Sheets

(56) References Cited

U.S. PATENT DOCUMENTS

| | | | |
|---|---|---|---|
| 2007/0260856 A1* | 11/2007 | Tran | G06F 9/3836 |
| | | | 712/217 |
| 2010/0325419 A1* | 12/2010 | Kanekar | H04L 63/0823 |
| | | | 713/151 |
| 2015/0154021 A1* | 6/2015 | Padmanabha | G06F 9/30058 |
| | | | 712/239 |
| 2015/0277925 A1* | 10/2015 | Sleiman | G06F 9/30098 |
| | | | 712/215 |
| 2016/0357564 A1* | 12/2016 | Brabender | G06F 12/10 |
| 2018/0039580 A1* | 2/2018 | Schneider | G06F 9/4403 |

* cited by examiner

| Core identifier 228 | Instruction identifier 225 | Status indicator 226 |

| Core identifier 228 | Source virtual address 230 | Destination virtual address 232 | Source physical address 234 | Destination physical address 236 | Number of remaining pages 238 | Remaining page offset 240 |
|---|---|---|---|---|---|---|
| 0x100 | 0x00000000 | 0x10000000 | 0x20000000 | 0x30000000 | 3 | 4096 |

METHOD AND APPARATUS FOR PROVIDING ACCELERATED ACCESS TO A MEMORY SYSTEM

TECHNICAL FIELD

The present disclosure generally relates to the field of computer architecture, and more particularly, to a method and an apparatus for providing accelerated access to a memory system.

BACKGROUND

A memory system, which may include dynamic random-access memory (DRAM) and cache memory devices, provides temporary storage space that can be accessed by a computer processor, or by other device (e.g., an input/output (I/O) device). The memory system can be used to store data, which can then be fetched to the computer processor and/or the I/O device. The computer processor can also store a result of the processing into the memory system for subsequent processing by the computer processor or by the I/O device. Although DRAM provides reasonable access speed, memory access latency remains a bottleneck to the computer processor, especially when the computer processor uses its computing resources to perform the memory access tasks. The memory access latency can severely degrade the performance of the computer processor when, for example, the processing of other instructions are delayed until the memory access tasks are completed.

SUMMARY

Embodiments of the present disclosure provide a computer system. The computer system comprises a memory system that stores data, a computer processor, and a memory access engine. The memory access engine is configured to: receive a first instruction of a computing process from the computer processor, wherein the first instruction is for accessing the data from the memory system; acquire at least a part of the data from the memory system based on the first instruction; and after the acquisition of the at least a first part of the data, transmit an indication to the computer processor to enable the computer processor to execute a second instruction of the computing process.

Embodiments of the present disclosure also provide another computer system. The computer system comprises a memory system that stores first data and second data, a computer processor comprising a first computer processor core associated with a first core identifier and a second computer processor core associated with a second core identifier, and a memory access engine. The memory access engine is configured to: receive a first instruction of a computing process from the first computer processor core, wherein the first instruction is for accessing the first data from the memory system; associate the first instruction with the first core identifier; acquire at least a part of the data from the memory system based on the first instruction; and after the acquisition of the at least a first part of the data, transmit an indication including the first core identifier to the computer processor to enable the first computer processor core to execute a second instruction of the computing process.

Embodiments of the present disclosure also provide a memory access method. The method can be performed by a memory access engine coupled with a computer processor and with a memory system. The method comprises: receiving a first instruction of a computing process from the computer processor, wherein the first instruction is for accessing the data from the memory system; acquiring at least a part of the data from the memory system based on the first instruction; and after the acquisition of the at least a first part of the data, transmit an indication to the computer processor to enable the computer processor to execute a second instruction of the computing process.

Embodiments of the present disclosure also provide another memory access method. The method can be performed by a memory access engine coupled with a memory system that stores first data and second data and coupled with a computer processor comprising a first computer processor core associated with a first core identifier and a second computer processor core associated with a second core identifier. The method comprises: receiving a first instruction of a computing process from the first computer processor core, wherein the first instruction is for accessing the first data from the memory system; associating the first instruction with the first core identifier; acquiring at least a part of the first data from the memory system based on the first instruction; and after acquiring the at least a part of the first data, transmit an indication including the first core identifier and an execution status of the first instruction to the computer processor to enable the first computer processor core to execute a second instruction of the computing process.

Additional objects and advantages of the disclosed embodiments will be set forth in part in the following description, and in part will be apparent from the description, or may be learned by practice of the embodiments. The objects and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Embodiments of the present disclosure provide a method and a memory access engine for providing accelerated access to a memory system. With an embodiment of the present disclosure, after a computer processor receives a memory access instruction of a computing process, the computer processor can transmit the instruction to a memory access engine, which can execute the memory access instruction on behalf of the computer processor. As a result, the computing resources of the computer processor can be freed from executing the high-latency memory access instruction, which can severely degrade the performance of the computer processor. Moreover, during the execution of the memory access instruction, the memory access engine can transmit a status indication to the computer processor. The status indication enables the computer processor to determine whether a subsequent instruction of the computing process has data dependency on the memory access instruction, and to execute the subsequent instruction as soon as the data dependency is removed, or found to be non-existent. As a result, the performance of the memory access task poses minimum interruption to the execution of the instructions of the computing process. These steps can significantly improve the performance of the computer processor.

Figure 1A:
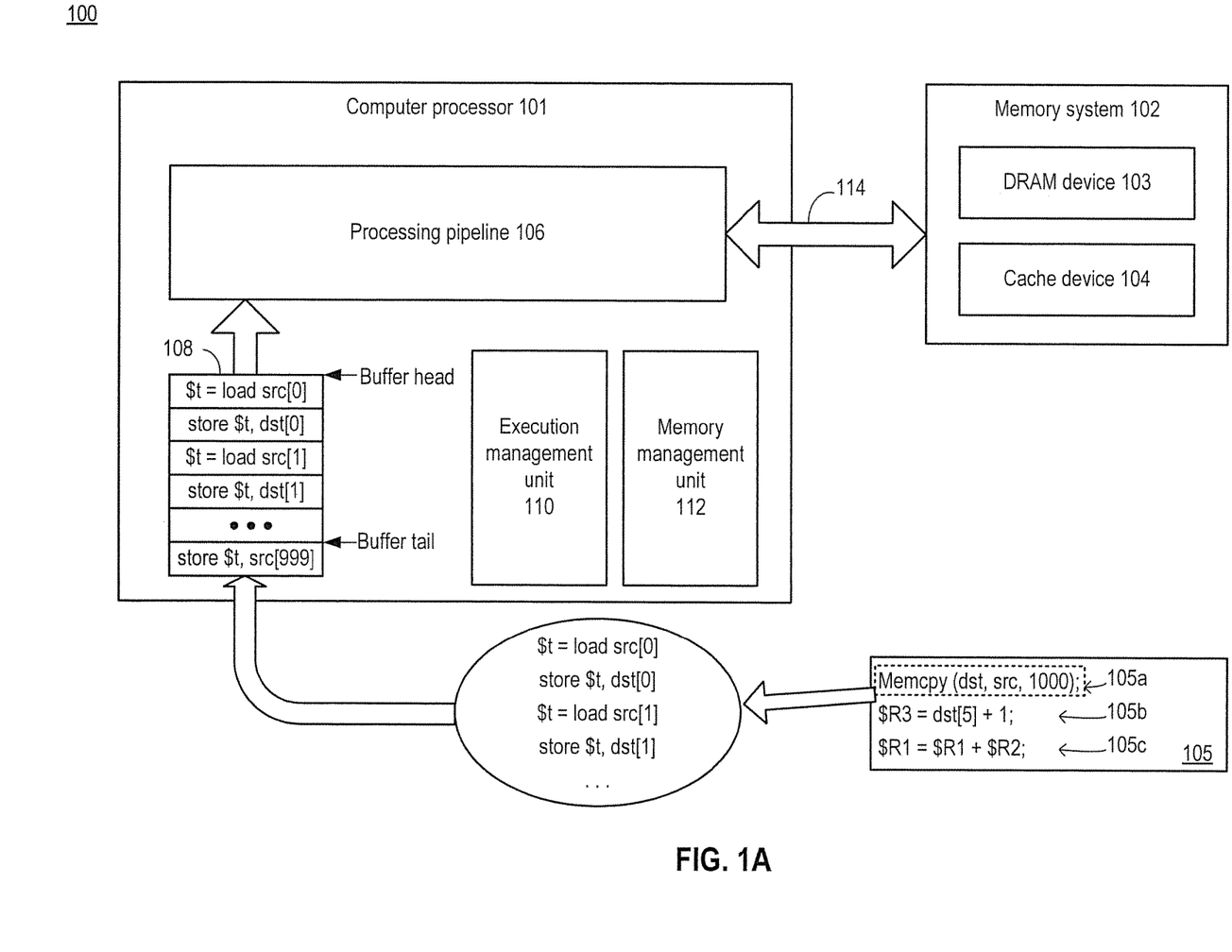
FIG. 1A is a schematic diagram illustrating an exemplary computer system in which embodiments of the present disclosure can be used.

Reference is now made to FIG. 1A, which illustrates a computer system 100 in which embodiments of the present disclosure can be used. As shown in FIG. 1A, computer system 100 includes a computer processor 101 and a memory system 102. Memory system 102 may include DRAM device 103 and cache device 104, and can store data and instructions. The instructions can be a part of a computer program 105 that, when executed by processing pipeline 106, causes processing pipeline 106 to access the data stored in memory system 102. The computer program can be generated by a compiler (not shown in FIG. 1A) into a set of instructions for execution by processing pipeline 106. As an illustrative example shown in FIG. 1A, computer program 105 includes instruction 105a, 105b, and 105c. Instruction 105a can be a "memcpy" (memory copy) instruction for copying 1000 bytes of data from a memory location labelled "src" to a memory location labelled "dst." The compiler may decode the memcpy instruction into a set of "load" instructions (for reading data from the memory) and "store" instructions (for writing data into the memory). Each load and store instruction can access 8 bytes of data in the memory. For example, for copying 1000 bytes of data, the compiler may generate 125 pairs of "load" and "store" instructions, each of which is for loading one byte of data from a location within the memory and storing the byte of data back to another location within the memory. Instructions 105b and 105c can be arithmetic instructions (e.g., addition).

Computer processor 101 also includes a processing pipeline 106, an instruction buffer 108, an execution management unit 110, and a memory management unit (MMU) 112. Each of the units and buffers may include a set of combinational and sequential logic circuits constructed based on, for example, metal oxide semiconductor field effect transistors (MOSFET). Execution management unit 110 can control and manage the execution of instructions by processing pipeline 106. For example, after execution management unit 110 receives an indication (e.g., from an operating system not shown in FIG. 1A) to execute computer program 105, execution management unit 110 can create a computing process, which can provide an indication of the state of execution of computer program 105 by processing pipeline 106. After creating the computing process, execution management unit 110 can load computer program 105 from a secondary storage device (e.g., a hard disk drive) into memory system 102, and control instruction buffer 108 to acquire a set of instructions of computer program 105 from memory system 102.

The set of instructions can be stored and executed according to a sequential order reflected in the computer program. For example, as shown in FIG. 1A, instruction buffer 108 includes a buffer head pointer and a buffer tail pointer. Under the control of execution management unit 110, instruction buffer 108 may fetch an instruction stored at a buffer location associated with the buffer head pointer to processing pipeline 106 for execution. Processing pipeline 106, when executing the instruction, can access memory system 102 to transmit or receive data 114 according to the instruction. After fetching the instruction, instruction buffer 108 can remove the instruction from the buffer, and move buffer head pointer to the next buffer location to fetch the next instruction for execution.

Execution management unit 110 can also control the fetching of instructions by instruction buffer 108 based on various criteria. For example, execution management unit 110 may determine whether an instruction causes an exception. An exception may occur when the execution of the instruction can lead to anomalous or exceptional operating conditions for the computer processor. As an illustrative example, the memcpy instruction of computer program 105 of FIG. 1A may cause computer processor 101 to access a memory location within memory system 102 that does not exist, or a memory location that computer processor 101 has no access permission.

MMU 112 allocates and manages memory spaces for different computing processes. After execution management unit 110 creates a computing process for the execution of computer program 105, MMU 112 can assign a set of physical memory locations in memory system 102, with each memory location being associated with a physical address. MMU 112 can also create a virtual memory space, and provide the virtual memory space to the computing process as an alias to the set of physical memory locations. The virtual memory space can include a set of pages, each of which can include a set of consecutive virtual memory locations to form a contagious memory space. Each virtual memory location can be associated with a virtual memory address and can be mapped to a physical memory location assigned by MMU 112. A page typically includes 4096 bytes of memory spaces, and the 1000 byte of data accessed by memcpy instruction 105a can be stored within one page of the virtual memory space.

The mapping between the virtual memory addresses and the physical memory addresses can be stored in a page table maintained by MMU 112. The page table is also accessible by execution management unit 110 for detecting exceptions. For example, based on virtual memory addresses associated with the memcpy instruction, execution management unit 110 can refer to the page table to obtain a set of corresponding physical addresses. If execution management unit 110 cannot find, from the page table, a physical address for a virtual address referred by computer program 105, or that the physical address is not accessible to computer program 105 (or processing pipeline 106), execution management unit 110 may determine that the memcpy instruction causes an exception. In such a case, special processing (e.g., changing the normal flow of the execution of the computer program, terminating the execution, etc.) may be needed to handle the exception. For example, execution management unit 110 may determine to change the flow of execution of computer program 105 (e.g., skipping the memcpy instruction, terminating the execution of computer program 105, etc.).

The handling of exception is different from the handling of an interrupt, in that an interrupt can cause computer processor 201 to suspend the execution of a computing process (e.g., the computing process for computer program 205), and start a second computing process (e.g., to acknowledge the interrupt). After the second computing process completes, computer processor 201 may switch back to the computing process for computer program 205, and execute the rest of the instructions of computer program 205. On the other hand, during the handling of an exception, computer processor 201 maintains the execution of the computer process that causes the exception.

Moreover, execution management unit 110 can also withhold the execution of a subsequent instruction, if the subsequent instruction has data dependency on prior instructions. The execution can also be withheld until computing resources are available. For example, as shown in FIG. 1A, instruction 105b of computer program 105, "$R3=dst[5]+1" requires data stored in the memory location labelled "dst," and the data is also modified by the previous memcpy instruction (instruction 105a). Based on a determination of such data dependency, execution management unit 110 can withhold the execution of instruction 105b until the execution of instruction 105a completes, to ensure that instruction 105b operates on the most up-to-date memory data. Moreover, although there is no data dependency between instruction 105c ($R2=$R1+1) and instructions 105a and 105b, the execution of instruction 105c may also be delayed due to limited computing resources. For example, instruction buffer 108 has a limited number of entries, and instruction 105c cannot be stored in instruction buffer 108 (and become available for fetching) until at least some of the instructions for the memcpy instruction have been fetched to processing pipeline 106 and removed from instruction buffer 108.

Figure 1B:
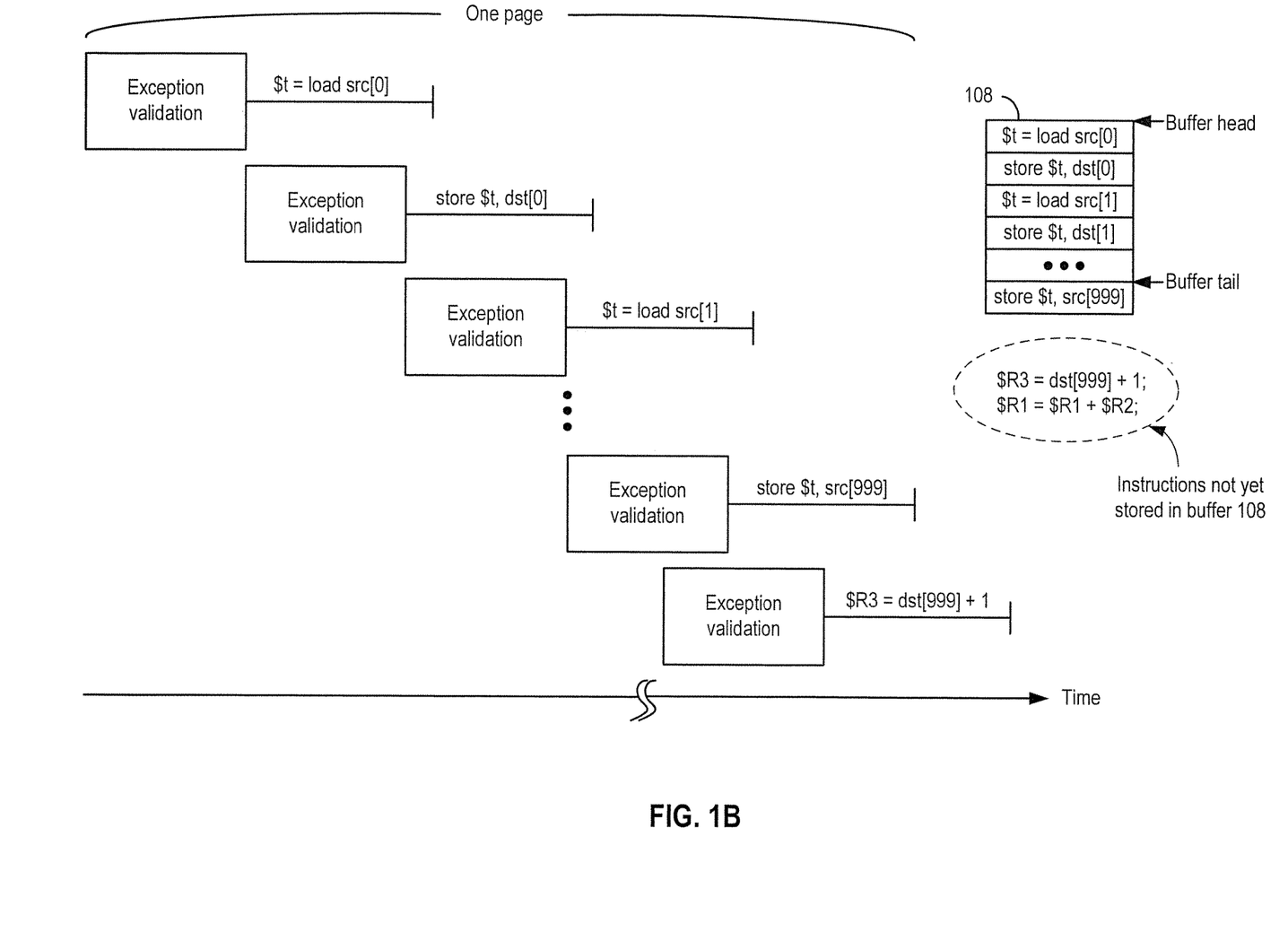
FIG. 1B is a timing diagram illustrating an exemplary operation of the computer system of FIG. 1A.

Reference is now made to FIG. 1B, which illustrates a timing diagram for execution of computer program 105 of FIG. 1A. As shown in FIG. 1B, before fetching each instruction (which includes reading one byte of data from the memory and storing one byte of data to the memory) from instruction buffer 108 to processing pipeline 106, execution management unit 110 performs exception validation by, for example, referring to the page table to obtain a physical memory address that corresponds to a virtual memory address referred to by the instruction. After determining that the instruction passes the exception validation, execution management unit 110 can fetch the instruction to processing pipeline 106 for processing. After the execution of memcpy instruction 105a completes, instructions 105b and 105c are then fetched to processing pipeline 106 for execution.

As shown in FIG. 1B, the execution of memcpy instruction 105a can cause tremendous delay to the execution of other instructions of computer program 105. For example, exception validation is performed for each of the 1000 single-byte memory access instructions, which adds delay to the execution of memcpy instruction 105a. Moreover, because the memory access instructions fill up instruction buffer 108, the execution of other instructions, including instruction 105c which does not depend on the execution result of memcpy instruction 105a, must also wait for at least some of the memory access instructions are fetched and removed from instruction buffer 108.

Figure 2A:
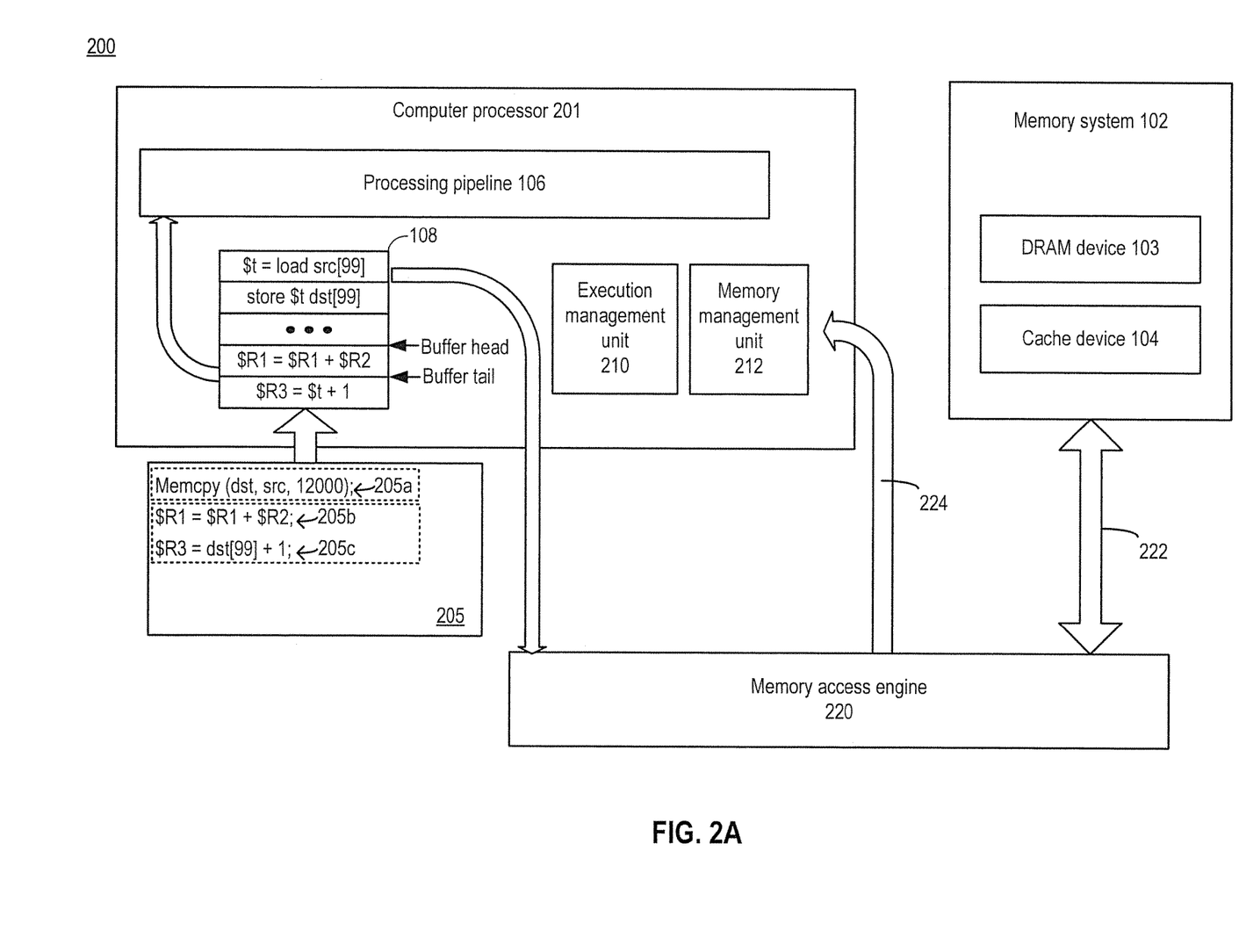
FIG. 2A is a schematic diagram illustrating an exemplary computer system according to embodiments of the present disclosure.

To alleviate the burden posed by high-latency memory access operations, a memory access engine can be provided to perform the memory access operations, which allows the computing resources of computer processor 101 to be used for other operations. Reference is now made to FIG. 2A, which illustrates a computer system 200 according to embodiments of the present disclosure. As shown in FIG. 2A, computer system 200 includes a computer processor 201, which includes processing pipeline 106 and instruction buffer 108 of FIG. 1A, an execution management unit 210, and a MMU 212. Computer system 200 also includes a memory access engine 220, and memory system 102 of FIG. 1A. Memory access engine 220 may include a set of combinational and sequential logic circuits constructed based on MOSFET.

Execution management unit 210 can control and manage the execution of instructions of computer program 205 by processing pipeline 106 and by memory access engine 220. After execution management unit 210 receives an indication (e.g., from an operating system not shown in FIG. 2A) to execute computer program 205, execution management unit 210 can create a computing process for computer program 205, and load the compiled instructions of computer program 205 from a secondary storage device (e.g., a hard disk drive) into memory system 102. Execution management unit 210 can control instruction buffer 108 to acquire the instructions from memory system 102 and store the instructions in the buffer.

After storing the instructions in the buffer, execution management unit 210 can also determine to delegate the execution of some of the instructions to memory access engine 200. The determination can be based on various criteria. As an example, execution management unit 210 may determine to delegate the execution of any instruction that involves copying or moving of data within a memory, including but not limited to memcpy and "strcpy" (string copy) instructions, to memory access engine 200. As another example, execution management unit 210 may also determine to delegate memory data copying/moving instructions that require a predetermined number of write and read operations to memory system 102 to memory access engine 220. As an illustrative example, execution management unit 210 may determine, based on the result of decoding instruction 205a, that the instruction includes a memcpy instruction for copying 12000 bytes of data from memory locations labelled "src" to memory locations labelled "dst." Execution management unit 210 may determine that instruction 205a requires a large number (e.g., 12000) of read operations (e.g., load instructions) and write operations (e.g., store instructions) to memory system 102, and can cause a huge delay to processing pipeline 106 due to the memory access latency. Based on these determinations, execution management unit 210 may delegate the execution of instruction 205a to memory access engine 220. As another example, execution management unit 210 may also determine to delegate the execution of memory data copying/moving instructions to memory access engine 220 in a case of a cache miss, which may require read and write operations to DRAM 103 with much larger access latency than, for example, read and write operations to cache device 104. In these examples, execution management unit 210 may transmit the set of load and store instructions representing instruction 205a to memory access engine 220 for execution. Memory access engine 220 can then acquire and/or store data 222 at memory system 102.

After transmitting instruction 205a to memory access engine 220 for execution, execution management unit 210 may remove the corresponding load and store instructions from instruction buffer 108 (e.g., by changing the location of the buffer head pointer), to allow processing pipeline 106 to execute the remaining instructions. If execution management unit 210 determines that the instruction associated with the buffer head pointer has no data dependency on any of the instructions being executed by memory access engine 220, execution management unit 210 can control instruction buffer 108 to fetch that instruction to processing pipeline 106 for execution, regardless of whether memory access engine 220 completes the execution of the instructions. As an illustrative example, as shown in FIG. 2A, after transmitting instruction 205a to memory access engine 220 for execution, execution management unit 210 may control instruction buffer 108 to fetch instruction 205b to processing pipeline 106, based on a determination that instruction 205b has no data dependency with respect to instruction 205a. With such arrangements, the execution of instruction 205b can occur in parallel with, rather than after, the execution of the memory access instruction 205a, and can be less affected by the memory access latency (especially for accessing the DRAM portion) of memory system 102. As a result, the performance of computer processor 202 can be improved.

On the other hand, if execution management unit 210 determines that the instruction associated with the buffer head pointer has data dependency on the memory access instructions being executed by memory access engine 220, execution management unit 210 may withhold fetching of the instruction to processing pipeline 106, until it receives an indication 224 from memory access engine 220 that the execution of at least some of the memory access instructions has been completed. Execution management unit 210 may also fetch other instructions that have no data dependencies while waiting for indication 224. As an illustrative example, as shown in FIG. 2A, execution management unit 210 may determine that instruction 205c performs an addition operation to a value stored in memory location "dst[099]." Moreover, execution management unit 210 may also determine that the memory location "dst[099]" is associated with the "dst" memory location, which is updated during the execution of memcpy instruction 205a. Therefore, execution management unit 210 may determine that instruction 205c has data dependency on instruction 205a. Based on this determination, execution management unit 210 may delay fetching instruction 205c to processing pipeline 106 until it receives an indication 224 from memory access engine 220 that memory location dst[099] has been updated by the execution of the memcpy instruction. In some embodiments, execution management unit 210 may also delay fetching instruction 205c to processing pipeline 106 until it receives an indication 224 that the execution of memcpy instruction 205a has completed.

Figure 2B:
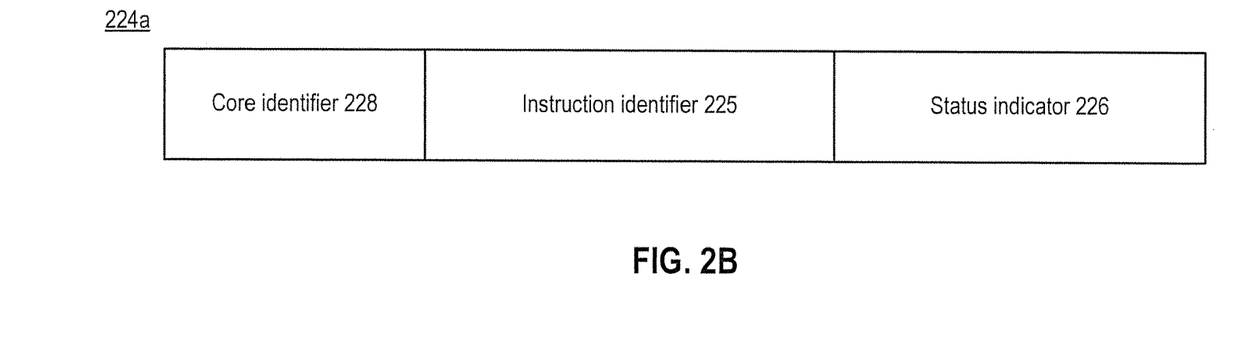
FIGS. 2B-2C are diagrams illustrating exemplary components of computer system of FIG. 2A.

Indication 224 can be a part of a communication from memory access engine 220 to execution management unit 210 (or to other components of computer processor 202) configured to provide a status of execution of the instructions memory access engine 220 to execution management unit 210. Reference is now made to FIG. 2B, which illustrates indication 224a as an example of indication 224 of FIG. 2A. As shown in FIG. 2B, indication 224a can include a mapping between one or more memory access instruction identifiers 225 and one or more status indicators 226. Instruction identifier 225 enables execution management unit 210 to keep track of the status of execution of a plurality of instructions transmitted to memory access engine 220. Status indicator 226 can include status data specific to the instruction. For example, in a case where the instruction includes a memory data copying or moving operation, status indicator 226 can include numeric values that indicate, for example, an amount of memory data that has been copied or moved.

In some embodiments, indication 224a may also include a core identifier 228, which can identify the processor core that transmits the instruction. In a case where computer system 200 includes a multi-core processor, each core can include a processing pipeline and an execution management unit, and can transmit the instruction to memory access engine 220 for execution. In such a case, memory access engine 220 can generate indication 224 that associates status information with each instruction it receives from each core, and broadcast indication 224 to each core. When a core receives indication 224, it can then refer to core identifier 228 to identify status information for instructions it transmitted to memory access engine 220. Memory access engine 220 may receive core identifier 228 from, for example, execution management unit 210.

Figure 2C:
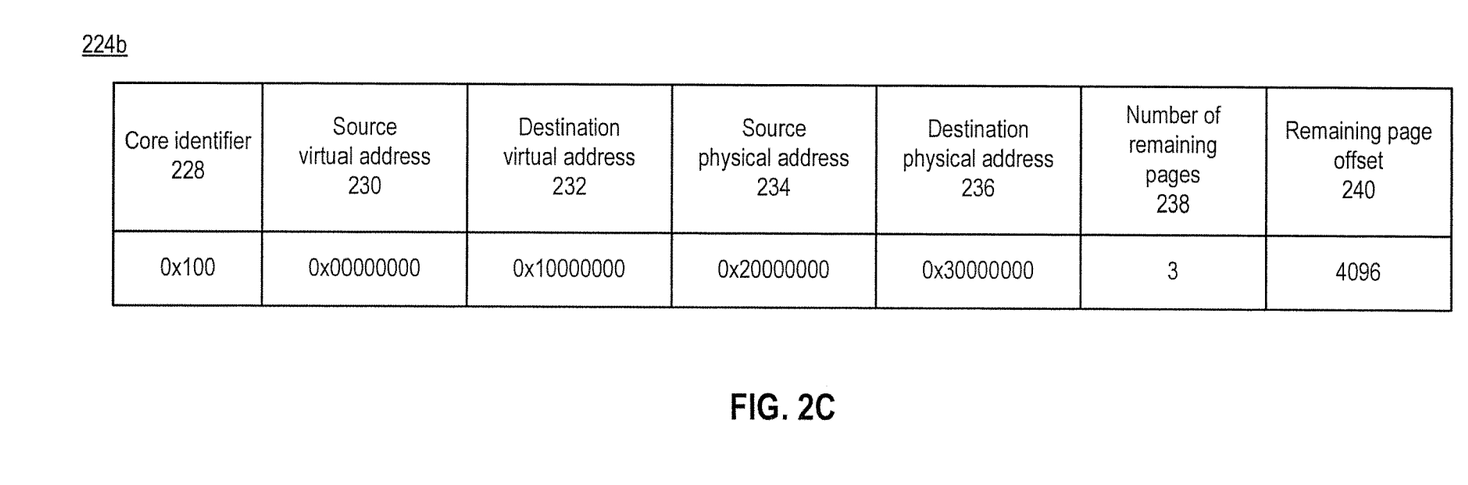

FIG. 2C illustrates indication 224b, which can be another example of indication 224. Indication 224b can be used to provide a status of execution of a memcpy instruction. As shown in FIG. 2C, indication 224b includes core identifier 228, and a set of address fields for source virtual address 230, destination virtual address 232, source physical address 234, and destination physical address 236. These addresses can be derived from the parameters of a particular memcpy instruction, and can be provided by MMU 212.

As an illustrative example, for instruction 205a "memcpy (dst, src, 12000)", the "dst" and "src" can be labels of memory locations in a virtual address space. The virtual address space can be allocated by MMU 212 to a computing process associated with the execution of computer program 205. For example, "src" can be a memory location for data to be copied and can be associated with a source virtual address 230 assigned by MMU 212, while "dst" can be a memory location to be updated with the data and can be associated with destination virtual address 232 assigned by MMU 212. Further, source virtual address 230 and destination virtual address 232 can be mapped to, respectively, source physical address 234 and destination physical address 236 of memory system 102 according to page tables provided by MMU 212.

After receiving memcpy instruction 205a (which includes a set of compiled load and store instructions) from execution management unit 210, memory access engine 220 can transmit one or more requests to MMU 212 to obtain the virtual and physical addresses associated with the instruction, and populate fields of source virtual address 230, destination virtual address 232, source physical address 234, and destination physical address 236 with the virtual and physical addresses provided by MMU 212. Memory access engine 220 can also determine a number of pages of virtual memory space to be copied based on the parameters of memcpy instruction 205a. For example, "memcpy (dst, src, 12000)" indicates that 12000 bytes of data are to be copied. Assuming a page size of 4096 bytes, memory access engine 220 can determine that a total of three pages worth of data are to be copied, and initialize the field number of remaining pages 238 with "3." Remaining page offset 240 can indicate the starting position of data in a particular page that is yet to be copied, and can be initialized at 4096.

As memory access engine 220 starts copying data from the "src" to the "dst" memory locations in the memory system, memory access engine 220 can update the values associated with source virtual address 230, destination virtual address 232, source physical address 234, destination physical address 236, number of remaining pages 238 and remaining page offset 240, and transmit the updated indication 224b to execution management unit 210. In some embodiments, memory access engine 220 may perform a read and a write operation for one cache line of data (e.g., 64 bytes) from cache device 104 (or same size of data from DRAM device 103 if there is a cache miss) at a time to perform the data copying, and can update these values after each read and write operations.

As an illustrative example, after memory access engine 220 performs one read and one write operation to copy data from a location within a page of the virtual memory space, memory access engine 220 can decrement the value associated with remaining page offset 240 by 64 bytes. Memory access engine 220 may also update source physical address 234 and destination physical address 236 by, for example, incrementing their values by 64 bytes as well, until the value at remaining offset 240 indicates a page copy has been completed. Memory access engine 220 can then transmit a request to MMU 212 for updated source and destination physical addresses for the next page. In some embodiments, memory access engine 220 can also transmit the request at the beginning of processing a page, and receive the source and destination physical addresses mapped to each virtual source and destination addresses of the page, and store it in a translation look-aside buffer (TLB). The TLB can operate as a cache for storing recently received mappings between a set of virtual addresses and a set of physical addresses from MMU 212. Memory access engine 220 can then refer to the TLB for the updated source physical address 234 and destination physical address 236 for the read/write operations for the page. In some embodiments, computer processor 201 may also include a TLB. Computer processor 201 can maintain consistency between the contents stored in the TLB of computer processor 201 and the contents stored in the TLB of memory access engine 220 by, for example, transmitting TLB invalidation requests and global TLB shoot-down events that occur in processing pipeline 106 to memory access engine 220.

After memory access engine 220 finishes copying all of the data for one page, which can be reflected by the value of remaining page offset 240 becoming zero, memory access engine 220 can proceed to the next page. Memory access engine 220 can decrement the value associated with the number of remaining pages 238 by one, and increment the values of source virtual address 230 and destination virtual address 232 by 4096 (the size of a page). The execution of the memcpy instruction completes when the value of remaining pages 238 becomes zero.

Execution management unit 210 may also delay fetching a subsequent instruction (e.g., instruction 205c) to processing pipeline 106 based on a determination of data dependency from indication 224b. For example, if the subsequent instruction includes a store operation to update a source memory location for memcpy instruction 205a, execution management unit 210 may determine that there exists a read-after-write dependency. Execution management unit 210 may delay fetching the subsequent instruction until the memcpy instruction has copied the data from source address location, to ensure the memcpy instruction reads the source before it is updated by the subsequent instruction. To determine the existence (or removal) of the write-after-read dependency, execution management unit 210 may determine, based on indication 224b, a current read virtual address being updated by the following exemplary equation:

$$\text{current read address} = \text{virtual address} + \text{number of remaining page} \times 4096 + \text{remaining page offset} \quad \text{(Equation 1)}$$

Here, the virtual address can be the value associated with source virtual address 230 or destination virtual address 232, the number of remaining page can be the value associated with number of remaining pages 238, and remaining page offset can be the value associated with remaining page offset 240. If a virtual write address to be updated by the store operation of the subsequent instruction exceeds the current read address determined based on Equation 1, execution management unit 210 may determine that the subsequent instruction attempts to update an address location that is yet to be read by the memcpy instruction 205a, and a write-after-read dependency exists. Execution management unit 210 may delay fetching the subsequent instruction to processing pipeline 106 until, based on indication 224a, execution management unit 210 determines that the current read address exceeds the virtual write address of the subsequent instruction, and that the write-after-read dependency has been removed.

Moreover, if the subsequent instruction includes a load operation from an address location updated by the memcpy instruction 205a (e.g., instruction 205c), execution management unit 210 may determine that there exists a read-after-write dependency, and may also delay fetching the subsequent instruction until the address location has been updated, to ensure the subsequent instruction reads the most up-to-date data. To determine the existence (or removal) of the read-after-write dependency, execution management unit 210 may determine, based on indication 224b, a current write virtual address being updated according to the following exemplary formula:

$$\text{current write address} = \text{virtual address} + \text{number of remaining page} \times 4096 + \text{remaining page offset} \quad \text{(Equation 2)}$$

Here, the virtual address can be the value associated with source virtual address 230 or destination virtual address 232, the number of remaining page can be the value associated with number of remaining pages 238, and remaining page offset can be the value associated with remaining page offset 240. If a virtual read address of the load operation of the subsequent instruction exceeds the current write address determined based on Equation 2, execution management unit 210 may determine that the subsequent instruction attempts to read a memory location that is yet to be updated by the memcpy instruction 205a, and a read-after-write dependency exists. Execution management unit 210 may also delay fetching the subsequent instruction to processing pipeline 106 until, based on indication 224a, execution management unit 210 determines that the current write address exceeds the virtual read address of the subsequent instruction, and that the read-after-write dependency can be removed.

In some embodiments, before performing the read/write operations of the memcpy instruction 205a, memory access engine 220 (or execution management unit 210) may determine whether the read/write operations may cause an exception. As discussed above, an exception may occur when, for example, the memcpy instruction causes the computer processor to access a memory location within memory system 102 that does not exist, or a memory location that the computer processor has no access permission. The determination of exception may occur when, for example, memory access engine 220 transmits a request for physical source and destination addresses for a page, or for all of the pages being updated by the particular memcpy instruction. If MMU 212 cannot provide at least one of the requested physical addresses, memory access engine 220 may determine that the memcpy instruction will cause an exception. In some embodiments, memory access engine 220 may determine whether the received physical addresses align with the boundary of a cache line of cache device 104, and may determine that the memcpy instruction operates on misaligned address space, which may prevent memory access engine 220 from performing read/write operations to one cache-line at a time. This can happen when, for example, computer program 205 does not incorporate buffer allocation routes such as malloc in heap management library to provide cache-line aligned buffers for the memcpy operation.

In all these examples, memory access engine 220 may transmit an indication of exception to computer processor 201, which may include an exception handler (not shown in FIG. 2A) to handle the exception. The exception information can be stored as a part of instruction buffer 108. For example, each entry of instruction buffer 108 can be associated with an exception bit (not shown in FIG. 2A). After receiving an indication from memory access engine 220 that the memcpy instruction 205a may cause an exception (e.g., due to failure of obtaining physical addresses), execution management unit 210 may assert the exception bits for all of the store and load instructions stored in the buffer that are associated with the memcpy instruction. Computer processor 201 may include an exception handler (not shown in FIG. 2A) to handle the exceptions by, for example, changing the normal flow of the execution of computer program 205, terminating the execution of computer program 205, etc.

Figure 2D:
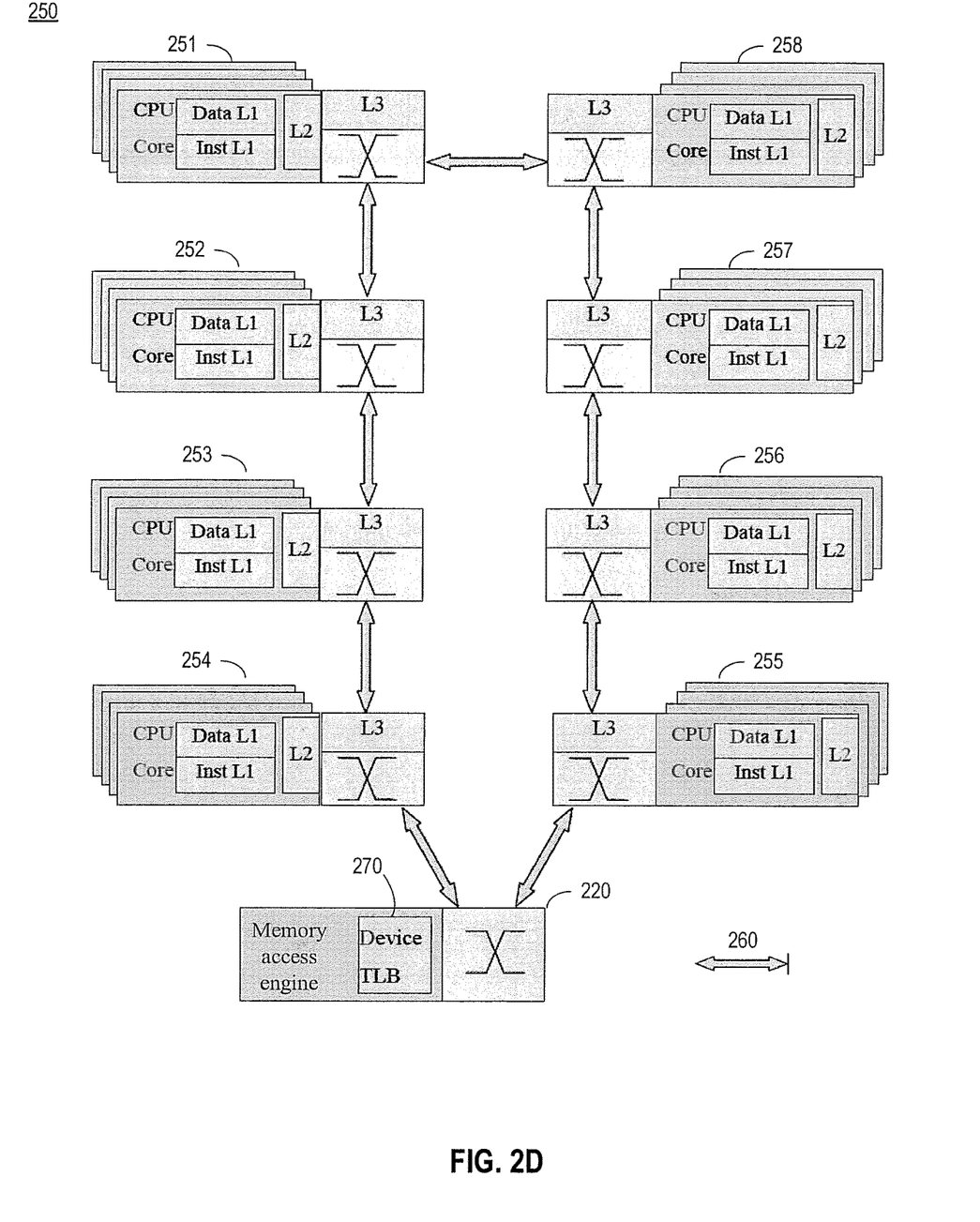
FIG. 2D is a schematic diagram illustrating another exemplary computer system according to embodiments of the present disclosure.

As discussed above, embodiments of the present disclosure can also be used in a computer system with multiple processor cores. Reference is now made to FIG. 2D, which illustrates a computer system 250 according to embodiments of the present disclosure. As shown in FIG. 2D, computer system 250 includes a set of computer processor cores 251-258, each of which has a level-1 (L1) data and instruction cache, a level-2 (L2) cache, and a level-3 (L3) cache. Among these caches, L1 cache has the smallest size but provides the highest access speed, while L3 cache has the largest size but provides the lowest access speed. Each computer processor core is associated with a core identifier. Each computer processor core also includes processing pipeline 106, execution management unit 210, and memory management unit 212 of FIG. 2A (which are not shown in FIG. 2D). Each of computer processor cores may execute a computing process. The computer processor cores may also execute different instructions associated with the same computing process concurrently, to speed up the completion of the computing process.

Computer system 250 further comprises memory access engine 220 of FIG. 2A, which can perform memory access operations (including access to L3 cache) on behalf of each of computer processor core. Memory access engine 220 may reside as hop separated from the computer processor cores of computer system 250. Memory access engine 220 may communicate with each of the computer processor cores 251-258 via, for example, a channel 260, with which memory access engine 220 can broadcast indication 224b of FIG. 2C. As discussed above, indication 224b associates the execution status information of a memory access instruction with a core identifier 228. Each of computer processor cores 251-258 can pick up the indication from channel 260, and determine the fetching of instructions based on status information associated with a matching core identifier.

Moreover, memory access engine 220 also stores a device-side TLB 270 which can be used to store recently received mappings between virtual addresses and physical addresses. Device-side TLB 270 can also be updated to be kept consistent with the entire MMU system. For example, the MMU of each of computer processor cores 251-258 may maintain one or more page tables that store the mapping between virtual addresses and physical addresses. Those page tables may be updated (e.g., by an operating system, or by other agents). In that case, the MMUs may circulate the updates over channel 260. Device-side TLB 270 can also pick up the updates over channel 260, and update the stored mappings accordingly.

Figure 2E:
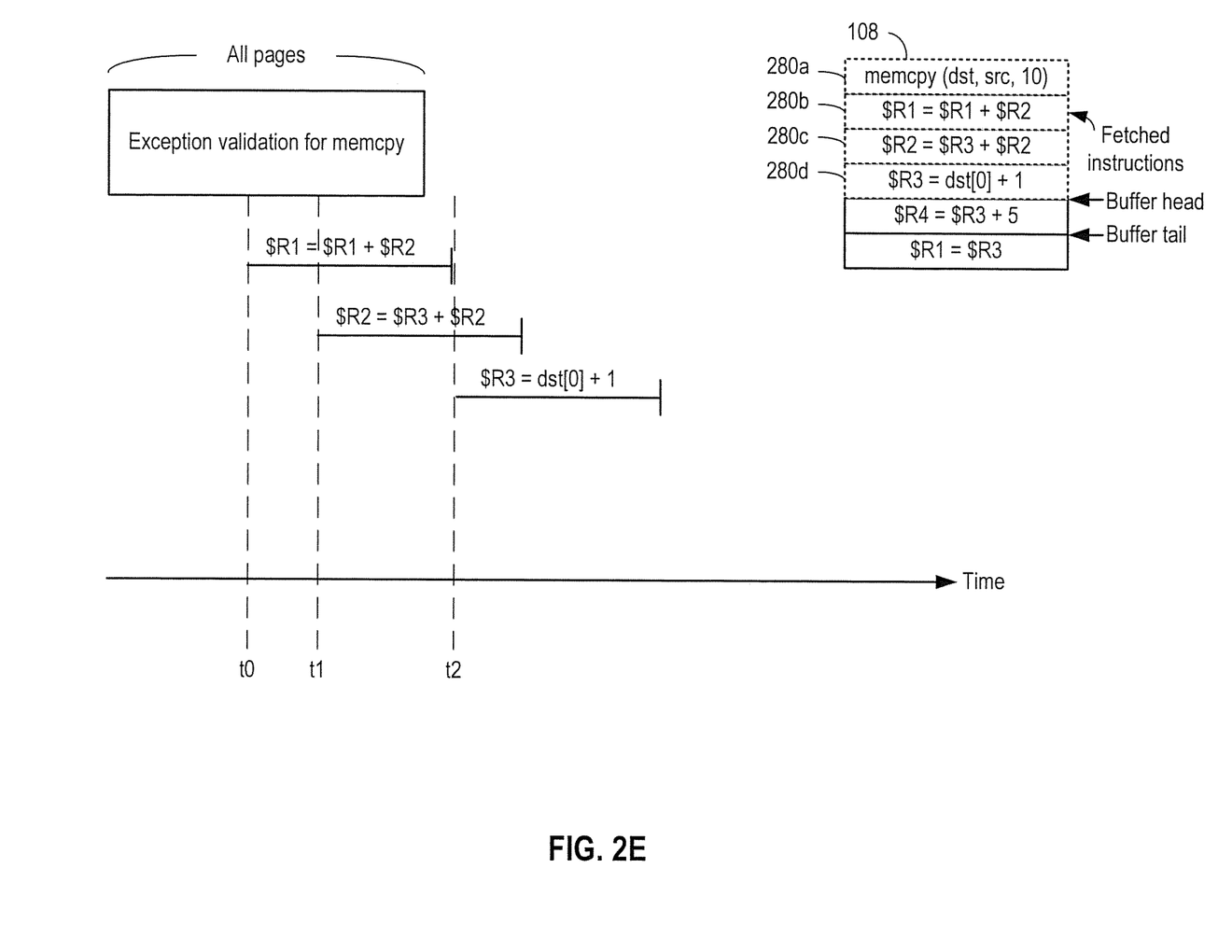
FIG. 2E is a timing diagram illustrating an exemplary operation of the computer system of FIG. 2A.

Reference is now made to FIG. 2E, which illustrates a timing diagram for execution of a computer program by computer system 200 of FIG. 2A. As shown in FIG. 2E, instruction buffer 108 stores instruction 280a (a memcpy instruction), and instructions 280b and 280c (arithmetic instructions that have no data dependency on instruction 280a), and instruction 280d (which has data dependency on instruction 280a). After execution management unit 210 receives instruction 280a, it performs exception validation for all pages of virtual memory space accessed by the memcpy instruction. At the same time, execution management unit 210 also determines whether the subsequent instructions 280b, 280c, and 280d have data dependency on instruction 280a. After determining instructions 280b and 280c have no data dependency, execution management unit 210 fetches instruction 280b to processing pipeline 106 for execution at time t0, followed by instruction 280c at time t1. After the instructions are fetched, they are removed from instruction buffer 108. On the other hand, execution management unit 210 also determines that instruction 280d has data dependency on the memcpy instruction, and withholds the fetching of the instruction to processing pipeline 106.

After the exception validation for memcpy completes, memory access engine 220 proceeds to perform the read and write operations, and transmit indication 224 to execution management unit 210 to provide a status of execution of the memcpy instruction. At time t2, based on indication 224, execution management unit 210 determines that the memory location to be accessed by instruction 280d has been updated by the memcpy instruction, and the data dependency has been removed. Therefore, execution management unit 210 fetches instruction 280d to processing pipeline 106 for execution, and removes instruction 280d from the buffer. This allows other subsequent instructions to be stored in instruction buffer 108 and wait to be fetched.

Figure 3:
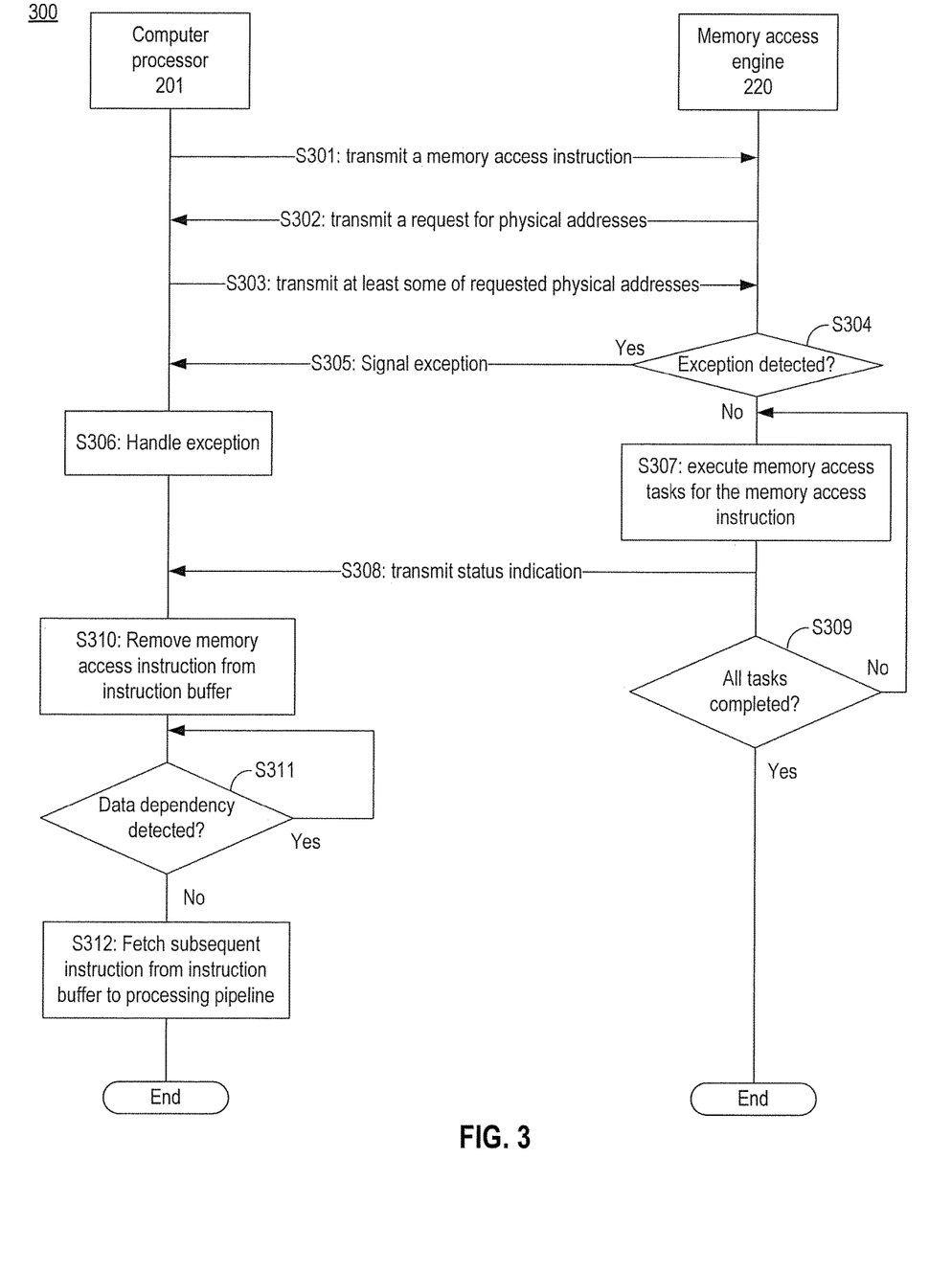
FIG. 3 is a flowchart illustrating an exemplary method of performing memory access, according to embodiments of the present disclosure.

Reference is now made to FIG. 3, which illustrates an exemplary method 300 of accessing a memory system. The method can be performed by a computer system (e.g., computer system 200) which includes computer processor 201 and memory access engine 220. In some embodiments, the method can also be performed by computer processor 201 alone if, for example, it includes memory access engine 220.

After an initial start, method 300 proceeds to step S301, where computer processor 201 transmits a memory access instruction (e.g., a memcpy instruction) to memory access engine 220 for execution. The memory access instruction may be executed as a part of a computing process, and may include a set of load and store instructions associated with a set of virtual addresses. The transmission can be based on, for example, a determination that the memory access instruction includes a large number of load and store operations to memory 102. After receiving the memory access instruction from computer processor 201, memory access engine 220 can transmit a request for physical addresses mapped to those virtual addresses of the memory access instruction, in step S302. Memory management unit 212 of computer processor 201 may transmit at least some of the requested physical addresses to memory access engine 220, in step S303.

Memory access engine 220 may determine whether an exception is detected in step S304. An exception may be detected when, for example, computer processor 201 fails to provide a physical address. If an exception is detected in step S304, memory access engine 220 may signal to execution management unit 210 of computer processor 201 that the memory access instruction may cause an exception, in step S305, which allows computer processor 201 to handle the exception, in step S306.

On the other hand, if no exception is detected in step S304, memory access engine 220 can execute memory access tasks for the memory access instruction, in step S307. As discussed above, memory access engine 220 may load or store one cache line of data at memory system 102 at a time. After executing one or more memory access tasks, memory access engine 220 may transmit an indication about the status of execution of the memory access instruction to execution management unit 210, in step S308. The indication may include, for example, a set of physical and virtual addresses that are being accessed by memory access engine 220, how much data are yet to be modified, etc. In some embodiments, the indication may include information included in indication 224b, including number of remaining pages 238, of FIG. 2C. Memory access engine 220 may also determine whether all of the memory access tasks have been completed, in step S309. The determination can be based on, for example, whether the number of remaining pages is zero. If memory access engine 220 determines that there are remaining tasks in step S309, it may continue the execution (in step S307).

Moreover, after execution management unit 210 receives the status indication from memory access engine 220, it may determine the execution of the memory access instruction will not cause any exception. It may then remove the memory access instruction from instruction buffer 108 to process a subsequent instruction of the same computing process, in step S310. Before fetching the subsequent instruction from instruction buffer 108 to processing pipeline 106 for execution, execution management unit 210 may determine whether the subsequent instruction has any data dependency (e.g., read-after-write, write-after-read, etc.) on the memory access instruction, in step S311. The determination can be based on, for example a source or a destination virtual address associated with the subsequent instruction, and a current source/destination virtual address determined based on the status indication received in step S308, and Equations 1 and 2 above. If no data dependency is detected in step S311, instruction buffer 108 of computer processor 201 may fetch the subsequent instruction to processing pipeline 206 in step S312. If data dependency is detected, instruction buffer 108 may delay the fetching until it determines that the data dependency has been removed, based on the updated status indication received in step S308.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A computer system comprising:
a memory system that stores data;
a computer processor having a memory management unit and an execution management unit; and
a memory access engine being configured to:
receive a first instruction of a computing process from the computer processor, wherein the first instruction is for accessing the data from the memory system;
acquire at least a part of the data from the memory system based on the first instruction; and
after the acquisition of the at least a first part of the data, transmit an indication to the execution management unit of the computer processor;
the computer processor being configured to:
determine whether a second instruction has data dependency on the first instruction based on the indication; and
in response to determining that the second instruction has no data dependency on the first instruction or that the second instruction's data dependency on the first instruction has been removed, execute the second instruction,
wherein the indication comprises information that indicates a size and a location of a second part of the data that has yet to be accessed.

2. The computer system of claim 1, wherein the memory access engine is further configured to:
obtain a virtual address associated with the first instruction;
obtain, based on the virtual address, a physical address associated with the first instruction;
determine, based on a result of obtaining the physical address, whether the first instruction causes an exception; and
responsive to determining that the first instruction causes an exception, transmit an indication to the computer processor to cause the computer processor to handle the exception.

3. The computer system of claim 2, wherein the determination of whether the first instruction causes an exception comprises the memory access engine being further configured to:
determine whether a page associated with the physical address exists; and
responsive to determining that the physical page does not exist, determine that the first instruction causes an exception.

4. The computer system of claim 2, wherein the determination of whether the first instruction raises an exception comprises the memory access engine being further configured to:
determine whether a page associated with at least one of the physical address and the virtual address is accessible; and
responsive to determining that the page is not accessible, determine that the first instruction causes an exception.

5. The computer system of claim 2, wherein the memory system includes a cache with a plurality of cache lines and wherein the determination of whether the first instruction causes an exception comprises the memory access engine being further configured to:

determine whether an address associated with the first instruction aligns with one of the plurality of cache lines; and responsive to a determination that the address does not align with any of the plurality of cache lines, determine that the first instruction causes an exception.

6. The computer system of claim 5, wherein the memory access engine is further configured to acquire the at least first part of data in one cache-line at a time.

7. The computer system of claim 1, wherein the second instruction has data dependency on the memory access instruction.

8. A computer system comprising:
a memory system that stores first data and second data;
a computer processor comprising a first computer processor core associated with a first core identifier, a second computer processor core associated with a second core identifier, an execution management unit, and a memory management unit; and
a memory access engine being configured to:
 receive a first instruction of a computing process from the first computer processor core, wherein the first instruction is for accessing the first data from the memory system;
 associate the first instruction with the first core identifier;
 acquire at least a part of the data from the memory system based on the first instruction; and
 after the acquisition of the at least a first part of the data, transmit an indication including the first core identifier to the execution management unit of the first computer processor core;
the first computer processor core being configured to:
 determine whether a second instruction has data dependency on the first instruction based on the indication; and
 in response to determining that the second instruction has no data dependency on the first instruction or that the second instruction's data dependency on the first instruction has been removed, execute the second instruction,
 wherein the indication comprises information that indicates a size and a location of a second part of the data that has yet to be accessed.

9. The computer system of claim 8, wherein the memory access engine is further configured to:
obtain a virtual address associated with the first instruction;
obtain, based on the virtual address, a physical address associated with the first instruction;
determine, based on a result of obtaining the physical address, whether the first instruction causes an exception; and
responsive to a determination that the first instruction causes an exception, transmit an indication to the first computer processor core to cause the first computer processor core to handle the exception.

10. The computer system of claim 8, wherein the memory access engine is also configured to:
receive a third instruction of the computing process from the second computer processor core for accessing the second data from the memory system; and
associate the third instruction with the second core identifier;
wherein the indication includes the second core identifier and an execution status of the third instruction; and wherein the second core identifier included in the indication enables the first computer processor core to disregard the execution status of the third instruction.

11. A memory access method, the method being performed by a memory access engine and a computer processor having a memory management unit and an execution management unit, the memory access engine being coupled with the computer processor and with a memory system that stores data, the method comprising:
receiving, by the memory access engine, a first instruction of a computing process from the computer processor, wherein the first instruction is for accessing the data from the memory system;
acquiring, by the memory access engine, at least a part of the data from the memory system based on the first instruction;
after acquiring the at least a first part of the data, transmitting, by the memory access engine, an indication to the execution management unit of the computer processor;
determining, by the computer processor, whether the second instruction has data dependency on the first instruction; and
in response to determining that the second instruction has no data dependency on the first instruction or that the second instruction's data dependency on the first instruction has been removed, executing the second instruction by the computer processor,
wherein the indication comprises information that indicates a size and a location of a second part of the data that has yet to be accessed.

12. The method of claim 11, further comprising:
obtaining, by the memory access engine, a virtual address associated with the first instruction;
obtaining, by the memory access engine, based on the virtual address, a physical address associated with the first instruction;
determining, by the memory access engine, based on a result of obtaining the physical address, whether the first instruction causes an exception; and
responsive to determining that the first instruction causes an exception, transmitting, by the memory access engine, an indication to the computer processor to cause the computer processor to handle the exception.

13. The method of claim 12, wherein the determination of whether the first instruction causes an exception comprises:
determining whether a page associated with the physical address exists; and
responsive to determining that the physical page does not exist, determining that the first instruction causes an exception.

14. The method of claim 12, wherein determining whether the first instruction raises an exception comprises:
determining whether a page associated with at least one of the physical address and the virtual address is accessible;
responsive to determining that the page is not accessible, determining that the first instruction causes an exception.

15. The method of claim 12, wherein the memory system includes a cache with a plurality of cache lines and wherein determining whether the first instruction causes an exception comprises:
determining whether an address associated with the first instruction aligns with one of the plurality of cache lines; and responsive to determining that the address does not align with any of the plurality of cache lines, determining that the first instruction causes an exception.

16. A memory access method, the method being performed by a memory access engine and a computer processor, the memory access engine being coupled with a memory system that stores first data and second data and coupled with the computer processor, the computer processor comprising a first computer processor core associated with a first core identifier, a second computer processor core associated with a second core identifier, an execution management unit, and a memory management unit, the method comprising:

receiving, by the memory access engine, a first instruction of a computing process from the first computer processor core, wherein the first instruction is for accessing the first data from the memory system;

associating, by the memory access engine, the first instruction with the first core identifier;

acquiring, by the memory access engine, at least a part of the first data from the memory system based on the first instruction;

after acquiring the at least a part of the first data, transmitting, by the memory access engine, an indication including the first core identifier and an execution status of the first instruction to the execution management unit of the first computer processor core;

determining, by the first computer processor core, whether the second instruction has data dependency on the first instruction; and in response to determining that the second instruction has no data dependency on the first instruction or that the second instruction's data dependency on the first instruction has been removed, executing the second instruction by the first computer processor core, wherein the indication comprises information that indicates a size and a location of a second part of the data that has yet to be accessed.

17. The method of claim 16, further comprising:
receiving, by the memory access engine, a third instruction of the computing process from the second computer processor core, wherein the third instruction is for accessing the second data from the memory system; and associating, by the memory access engine, the third instruction with the second core identifier;

wherein the indication includes the second core identifier and an execution status of the third instruction; and wherein the second core identifier included in the indication enables the first computer processor core to disregard the execution status of the third instruction.

* * * * *